United States Patent
Jin

(10) Patent No.: US 11,388,794 B2
(45) Date of Patent: Jul. 12, 2022

(54) METHOD AND ILLUMINATION SYSTEM FOR SIMULATING CIE STANDARD ILLUMINANT WITH MULTI-CHANNEL LED

(71) Applicant: Peng Jin, Beijing (CN)

(72) Inventor: Peng Jin, Beijing (CN)

( * ) Notice: Subject to any disclaimer, the term of this patent is extended or adjusted under 35 U.S.C. 154(b) by 0 days.

(21) Appl. No.: 17/382,234

(22) Filed: Jul. 21, 2021

(65) Prior Publication Data

US 2021/0352785 A1 Nov. 11, 2021

Related U.S. Application Data

(63) Continuation of application No. PCT/CN2020/071762, filed on Jan. 13, 2020.

(51) Int. Cl.
| | |
|---|---|
| H05B 45/14 | (2020.01) |
| H05B 45/28 | (2020.01) |
| H05B 45/24 | (2020.01) |
| F21K 9/64 | (2016.01) |
| F21Y 115/10 | (2016.01) |

(52) U.S. Cl.
CPC ............... *H05B 45/14* (2020.01); *F21K 9/64* (2016.08); *H05B 45/24* (2020.01); *H05B 45/28* (2020.01); *F21Y 2115/10* (2016.08)

(58) Field of Classification Search
None
See application file for complete search history.

(56) References Cited

U.S. PATENT DOCUMENTS

2006/0237636 A1\* 10/2006 Lyons ................. F21S 10/02
250/228

\* cited by examiner

*Primary Examiner* — Dedei K Hammond

(57) ABSTRACT

A method and an illumination system for simulating a CIE standard illuminant with a multi-channel LED are disclosed. The method includes adjusting a brightness of the main light source control channel, the wavelength complementary control channel, the color temperature adjustment control channel to make a mixed chromaticity coordinate meet a chromaticity coordinate of the CIE standard illuminant to be simulated according to chromaticity coordinates. The LED control channels are reduced through group optimization, and a technology which is discarded by multi-channel LED such as a filter is used, a control of a light source substantially reducing number of control channels and enabling a multi-channel LED to simulate a standard illuminant is formed, such that a single chromaticity control rather than a chromaticity control which must be transformed by a spectral conversion is achieved.

8 Claims, 5 Drawing Sheets

```
┌─────────────────────────────────────────────────────────────────┐
│ selecting a high-CRI LED as the main light source according to   │
│ the color temperature adjustment direction within the color      │──S1
│ temperature range of the CIE standard illuminant to be simulated │
└─────────────────────────────────────────────────────────────────┘
                                ↓
┌─────────────────────────────────────────────────────────────────┐
│ placing less than or equal to 1 kind of main light source        │
│ control channel chromaticity coordinate rectifying filter        │──S2
│ containing color material above the main light source to form    │
│ the main light source control channel                            │
└─────────────────────────────────────────────────────────────────┘
                                ↓
┌─────────────────────────────────────────────────────────────────┐
│ selecting the plurality of LEDs with n kinds of wavelength for   │
│ supplementing the spectral wavelength coverage of the CIE        │
│ standard illuminant to be simulated to form a wavelength         │──S3
│ complementary control channel light source by comparing a        │
│ spectral wavelength coverage of the main light source selected   │
│ with a spectral wavelength coverage of the CIE standard          │
│ illuminant to be simulated                                       │
└─────────────────────────────────────────────────────────────────┘
                                ↓
┌─────────────────────────────────────────────────────────────────┐
│ determining a number of LEDs of each wavelength within the       │
│ plurality of LEDs with n kinds of wavelengths, and forming, by   │
│ the corresponding number of LEDs with n kinds of wavelengths,    │
│ the wavelength complementary control channel according to a      │
│ relative radiant emittance of a wavelength of the LEDs with n    │──S4
│ kinds of wavelengths within the standard illuminant of the       │
│ wavelength complementary control channel within the spectral     │
│ wavelength coverage of the CIE standard illuminant to be         │
│ simulated and a radiant emittance of a wavelength of LED of each │
│ wavelength within the LEDs with n kinds wavelength               │
└─────────────────────────────────────────────────────────────────┘
                                ↓
┌─────────────────────────────────────────────────────────────────┐
│ selecting an LED as a light source of the color temperature      │
│ adjustment control channel and a filter according to the color   │
│ temperature simulation range and color temperature adjustment    │──S5
│ direction of the CIE standard illuminant to be simulated to      │
│ form the color temperature adjustment control channel            │
└─────────────────────────────────────────────────────────────────┘
                                ↓
┌─────────────────────────────────────────────────────────────────┐
│ arranging the main light source control channel, the wavelength  │
│ complementary control channel and the color temperature          │
│ adjustment control channel according to a vertical distance      │──S6
│ between an anti-glare homogenize lens and the LED and a          │
│ recommend ratio of an arrangement distance to form a tightly     │
│ spaced group, and replicating the group to achieve a required    │
│ maximum illumination                                             │
└─────────────────────────────────────────────────────────────────┘
                                ↓
┌─────────────────────────────────────────────────────────────────┐
│ adjusting a brightness of the main light source control channel, │
│ the wavelength complementary control channel, the color          │
│ temperature adjustment control channel to make a mixed           │──S7
│ chromaticity coordinate meet a chromaticity coordinate of the    │
│ CIE standard illuminant to be simulated according to             │
│ chromaticity coordinates of a chromaticity measurement           │
└─────────────────────────────────────────────────────────────────┘
                                ↓
┌─────────────────────────────────────────────────────────────────┐
│ adding a second main light source control channel for a key      │──S8
│ point color temperature                                          │
└─────────────────────────────────────────────────────────────────┘
                                ↓
┌─────────────────────────────────────────────────────────────────┐
│ forming a closed-loop feedback system by a microcomputer         │──S9
│ processor and a chromaticity measurement                         │
└─────────────────────────────────────────────────────────────────┘
```

FIG. 3

METHOD AND ILLUMINATION SYSTEM FOR SIMULATING CIE STANDARD ILLUMINANT WITH MULTI-CHANNEL LED

TECHNICAL FIELD

The present disclosure relates to the field of light sources for colorimetry, and more specifically, to a method and an illumination system for simulating a CIE standard illuminant with a multi-channel LED.

BACKGROUND ART

The original standard illuminants in the field of colorimetry include five kinds of illuminants, i.e. A, B, C, D and E. Due to the inconvenient use of the B and C illuminant filters, which do not contain UV spectral energy. Historical recommendations for current abolition status have been included in the CIE 015 Technical Report Manual, which was updated for the third time in 2004. The E illuminant is equal-energy white light, which belongs to a consistent white point reference for artificial identification, and is not applied to the field of illumination for colorimetry. A illuminant is an approximately smooth and continuous spectral energy distribution with a color temperature of 2856 K, which is provided in many light sources, such as a tungsten filament lamp with a color temperature of 2856 K which is recommended by CIE as a standard light source for an A illuminant. If commonly High CRI (color rendering index) LED needs to reach the A illuminant standard, the method for simulating is needed. There is also the most widely used D illuminant, CIE has not given the suggestion of light source, so it is an important subject of simulation illuminants in the industry. High-quality CIE standard illuminant sources, especially D illuminant are often needed in the field of colorimetry such as color subjective evaluation, color measurement, photography, advanced image acquisition and analysis, etc. Since CIE has not so far given any suggestion of a light source suitable for a D illuminant, the D illuminant required in these fields for a long time has low dependence on the realization of three light sources, which are light source formed by A light source with color filter, standard fluorescent tube light source, multi-channel LED mixed light source based on spectrum control.

Although the light source formed by A light source with color filter has good performance index, its energy consumption problem, life problem and the cost problem caused by the combination of these two problems, it can only be applied to some instruments, such as colorimetric light box and spectrophotometer etc. The standard fluorescent tube light source with poor performance but low energy consumption is used in the industries with large amount of application. The high-performance LED mixed light source based on multi-channel spectral control is unlikely to be widely used because of its higher cost.

With the large-scale application a cheap and energy-saving technology of the high-visibility LED in a variety of light fields, People in these fields of colorimetry vision are eager to use this kind of LED technology to gradually replace the traditional standard fluorescent tube light source with the following disadvantages:

1. In that conventional standard fluorescent lamp, the color temperature is constant and cannot be adjusted, and these fields often require multiple color temperature standard light sources for reference, for example, the D50 illuminant specified in the ISO 3664 international standard for color subjective evaluation in the field of colorimetry related printing, while the relevant Chinese standard pays more attention to the actual effect and recommends D50 and D65 illuminants.
2. In that traditional standard fluorescent lamp, the product chromaticity coordinate deviation between different manufacturer is too large, so that some relevant ISO international standards set the chromaticity coordinate u' v' tolerance of the light source to an excessive range of 0.005, resulting obvious color difference in different manufacturers or even different batches of light source.
3. Conventional standard fluorescent tubes have a short service life. In order to meet that standard in these fields, the service life of the traditional standard fluorescent lamp tube can only be 2000-2500 hours in these fields and they have to be replaced.
4. Since the brightness of a conventional standard fluorescent tube cannot be adjusted, the energy consumption problem is caused. For example, in the application of printing production in the color evaluation link, the standard observation environment ISO 3664:2009 clearly defines two illumination environments, one is a high illumination of 2000 lux used for the stringent evaluation condition P1 and another is a 500 lux illumination used for actual evaluation condition P2 in printed matter. An experience suggestion is explicitly indicated in 4.3.1 of ISO 3664:2009. The high illumination level of P1 will give human error feeling in terms of order modulation and color of the image. These images eventually need to be applied by the consumer at low luminance levels. Images that are very pleasing at very high illuminance may not be satisfactory at normal illuminance. In the whole process of actual printing, only about 10-20% of the time requires illumination of the P1 condition, and the remaining 80-90% of the time should use the P2 condition to assist the P1 condition so that the worker can save this part of energy while compatibility with the actual effect of the printed matter, but this cannot be realized under a conventional standard fluorescent tube.
5. Traditional standard fluorescent tube has a low spectral grade. Generally, the metamerism index can only reach the CD grade, i.e. the visible light metamerism index is at the C grade of less than 1.0, the ultraviolet metamerism index is at the D grade of less than 1.5, and the high-end product metamerism index of some individual manufacturers can barely reach the CC grade, while the BC grade is recommended in the ISO 3664, and the CD grade is defined as the minimum index which is not recommended but can be used.
6. The color rendering index of spectrum of the conventional standard fluorescent tube is low. Generally, the color rendering index Ra>90%, and the special color rendering index Ri>80. The color rendering index is an important index, and it can be seen from the calculation formula 100-4.6ΔE that the index directly complies with the color difference of the object under the light source and under the standard light source. If the saturated color represented by the color rendering index of 80 is converted into chromatic aberration, it is about 4.35. This chromatic aberration is not acceptable in these fields but has to be acceptable.
7. In the field of chromaticity applications, the color seen under a traditional standard daylight lamp tube does not match the measurement value of the instrument, and often the case of inconsistency occurs, and it is clear that the measurement is correct but visually erroneous.

8. The spectrum of the conventional standard fluorescent tube cannot be corrected, and the fluorescent tube needs to use a beam reflector for 360 degrees of luminescence, and in order to reduce the influence of dust on light, there is also a layer of light-transmitting plate on the lighting device, and the reflector and the light-transmitting plate can further influence the quality of the light source which is not high in performance, and this influence needs to be reduced by correcting spectrum.

In addition to the technical drawbacks of standard light source lamp tubes, the more important defect is that it belongs to fluorescent lamp, with a short lifetime The standard light source lamp tube is hazardous waste because it contains mercury. Currently, there is no recycling related organizations in China, and there is no mention of such hazards in green printing certification in the printing industry with a large amount of application, and there is a large amount of standard light source lamp tubes discarded every year. "Minamata Convention on Mercury", which came into force on Aug. 16, 2017, states that "starting from 2021, China will phase out the production and use of mercury-containing batteries and fluorescent lamp products required by the Minamata Convention on Mercury; all main mercury mines should be closed by 2032". Currently, the common lighting field has basically been replaced by LED, and the only professional lighting related to the field of the present invention cannot be replaced or a high cost needs to be replaced, and if a replacement is desired, it must be forced by administrative, and these costs are unwilling to bear for related industrial applications. Due to environmental issues, people are eager for an environmentally friendly product having a closer or lower cost than the standard light source lamp to replace the standard light source lamp.

Although standard light source lamp tubes have these drawbacks, High CRI LEDs have good color rendering performance and are equivalent, and the full lifetime cost is much lower than that of standard light source lamp tubes, people still cannot find a suitable method to make high-CRI LEDs widely used in these fields of chromaticity. The high-CM LED is superior to the traditional standard daylight lamp tube in terms of color rendering index, environmental protection, energy consumption, lifetime, stability and full lifetime cost, but its color coordinates and color temperature deviate from the D illuminant, and the visible light metamerism index of most high-CM LEDs can only reach the grade d which is smaller than 1.5. Since it does not contain ultraviolet spectral energy, its ultraviolet light metamerism index is large than 2. LEDs belong to dot-like light sources, and tend to easily form glare light after being arranged, it is usually necessary to use a lens to even the light before it can be used for visual illumination, and the lens will affect the technical performance of the LED. Comprehensive analysis is that these factors hinder the application of such high-performance, low-energy-consumption and low-cost light sources in these professional fields, and a person skilled in the relevant art has hitherto failed to apply the high-CM LEDs in such fields.

In order to increase the application range of the high-CRI LED, the prior art discloses some multi-channel LED mixing technologies, which can partially meet standard light source requirements in these fields, for example, U.S. Pat. No. 8,592,748B2, US2016100298255 and US201810812579.X. The patent No. U.S. Pat. No. 8,592,748B2 filed by the patentee "Just Normlicht" who is Standard light source industry giant, discloses that five different wavelength monochromatic LEDs and two different color temperature white LED channels are fitted by means of a spectral curve to realize a standard illuminant light source with a tunable color temperature of 2700 k-1000 k, especially a simulation of the D illuminant. Subsequently, 2016, the application No. CN2016100298255 filed by THOU-SLITE in which the chairman of CIE Colour and Vision worked as the chief scientist, discloses that 14 LED chips of different wavelengths are used to realize a standard illuminant light source with a tunable color temperature of 2700 k-1000 k by means of a spectral curve multipoint approach to the target spectrum, and the application pushes the performance of the multi-channel LED illumination standard illuminant towards extreme, especially the performance of D illuminant light source. Finally, in the application No. CN201810812579. X filed by "ZHEJIANG ZHICAI TECH CO LTD" in 2018, 7 monochromatic LEDs cooperate with two white LEDs, similar to the 5+2 channel deformation of the U.S. Pat. No. 8,592,748B2 patent, a simple spectral mixing process is written into a stack of formulas, and then a standard illuminant D65 light source is mixed. From the history process of multi-channel LED simulation standard illuminant, a prejudice can be seen that one multi-channel LED simulation CIE standard illuminant relies only on the spectral curve infinity approach method. This prejudice is due to chromaticity coordinates, color temperature, color rendering index, metamerism index, etc. All parameters used for the performance description are obtained by conversion from the spectrum. Namely, the same spectrum has technical parameters such as 100% identical color coordinates, color temperature, color rendering index, and isochromatic spectral index. Through Reverse adjustment of these parameters, it is impossible to simultaneously achieve relatively high technical indexes for all parameters. For example, based on the white light simulated by the four-channel RGBW, the technology cannot achieve the light source performance of the CIE standard illuminant by controlling the simulated white light performance by chromaticity. Since the characteristics of the monochromatic LED having a large wavelength and a small wavelength range are exactly suitable for the infinite approximation of the spectral curve of the standard illuminant D in which the spectral curve is not smooth, so that when there is no LED technology, people simulate A light source to D light source with good effect by means of filter. The filter used is not listed in the technical method considered by the LED multi-channel technology. From the implementation of the 5+2 channel of the first patent in 2009, the 14 channels achieve extreme performance in 2016, and then the so-called n−2 substantively is 7+2 LEDs mixed in 2018, and without exception the dense arrangement of the spectrum is used to fill the missing wavelength and the spectrum of each fill wavelength is infinitely approximated to the spectrum of the standard illuminant. The industry giants industry experts and ordinary technicians in the industry represented by these three patents or applications do not consider the multi-channel LED to implement other possible standard illuminant light sources such as similar filters or excitation lenses to participate in the multi-channel LED simulation standard illuminant since 2009, or has been considered but it cannot be realized after countless experiments because it does not conform to the principle of spectral supremacy. Alternatively, no effect is produced after the addition or the opposite effect is produced, and the use of such a method to participate in the multi-channel LED simulation standard illuminant is abandoned.

In addition, the multi-channel LED mixing technology disclosed in the above three patents or applications cannot be widely used in these chromaticity related fields due to high cost. The reason for high cost is that the three patents or applications base on the method of spectral computation and spectral infinity approximation. However, the correction of the method requires a spectrophotometric instrument or sensor. Since the standard illuminant, especially D illuminant, contains ultraviolet light energy which will lead to anti-glare and cause yellowing of lenses for homogenization, which further requires a feedback of data acquisition of these instruments or sensors for a light source with a lifetime of up to 50 thousand hours, when the light source needs to be stabilized continuously in a high-quality technology indicator.

Although other LEDs of violet chips can meet part of the requirements of the CIE standard illuminant D, its lifetime is too short, the color temperature is constant, the price is too high, and the manufacturer cannot be widely applied without considering the deviation caused by the anti-glare lens.

SUMMARY

In order to solve the problems in the prior arts, the present disclosure provides a method for simulating CIE standard illuminants with a multi-channel LED and an illumination system.

A method for simulating a CIE standard illuminant with a multi-channel LED is provided, the method includes following steps:

selecting a high-CRI LED as a main light source to form a main light source control channel according to a color temperature adjustment direction within a color temperature range of a CIE standard illuminant to be simulated;

selecting LEDs with n kinds of wavelength for supplementing a spectral wavelength coverage of the CIE standard illuminant to be simulated to form a wavelength complementary control channel by comparing a spectral wavelength coverage of the main light source selected with a spectral wavelength coverage of the CIE standard illuminant to be simulated, wherein $n \geq 1$;

selecting an LED as a light source of a color temperature adjustment control channel and a filter to form the color temperature adjustment control channel according to a color temperature simulation range and a color temperature adjustment direction of the CIE standard illuminant to be simulated;

adjusting a brightness of the main light source control channel, the wavelength complementary control channel, the color temperature adjustment control channel to make a mixed chromaticity coordinate meet a chromaticity coordinate of the CIE standard illuminant to be simulated according to chromaticity coordinates.

In an improvement solution, the method further includes:

selecting a high-CM LED as the main light source according to the color temperature adjustment direction within the color temperature range of the simulated CIE standard to be simulated;

placing less than or equal to 1 kind of main light source control channel chromaticity coordinate rectifying filter containing color material above the main light source to form the main light source control channel;

selecting LEDs with n kinds of wavelength for supplementing the spectral wavelength coverage of the CIE standard illuminant to be simulated to form a wavelength complementary control channel light source by comparing a spectral wavelength coverage of the main light source selected with a spectral wavelength coverage of the CIE standard illuminant to be simulated;

determining a number of LED of each wavelength within LEDs with n kinds of wavelength, and a corresponding number of LEDs with n kinds of wavelength are used to form the wavelength complementary control channel according to a relative radiant emittance of a wavelength of the LEDs with n kinds of wavelength within the standard illuminant of the wavelength complementary control channel within the spectral wavelength coverage of the CIE standard illuminant to be simulated and a radiant emittance of a wavelength of LED of each wavelength within the LEDs with n kinds wavelength;

selecting an LED as a light source of the color temperature adjustment control channel and a filter according to the color temperature simulation range and color temperature adjustment direction of the CIE standard illuminant to be simulated to form the color temperature adjustment control channel;

adjusting a brightness of the main light source control channel, the wavelength complementary control channel, the color temperature adjustment control channel to make a mixed chromaticity coordinate meet a chromaticity coordinate of the CIE standard illuminant to be simulated according to chromaticity coordinates of a chromaticity measurement.

In an improvement solution, before the step of adjusting a brightness of the main light source control channel, the wavelength complementary control channel, the color temperature adjustment control channel to make a mixed chromaticity coordinate meet a chromaticity coordinate of the CIE standard illuminant to be simulated according to chromaticity coordinates of chromaticity measurement, the method further includes following step:

arranging the main light source control channel, the wavelength complementary control channel and the color temperature adjustment control channel according to a vertical distance between an anti-glare homogenize lens and the LED and a recommend ratio of an arrangement distance to form a tightly spaced group, and replicating the group to achieve a required maximum illumination.

In an improvement solution, the method further includes following step:

adding a second main light source control channel for a color temperature of a key point.

In an improvement solution, the method further includes following step:

forming a closed-loop feedback system by a microcomputer processor and a chromaticity measurement.

The present disclosure further provides an illumination system for simulating a CIE standard illuminant with a multi-channel LED, the system includes:

a main light source control channel using a high-CRI LED as a main light source, wherein the high-CRI LED is selected according to a color temperature adjustment direction within a color temperature range of a CIE standard illuminant to be simulated;

a wavelength complementary control channel formed by LEDs with n kinds of wavelength for supplementing a spectral wavelength coverage of the CIE standard illuminant to be simulated by comparing a spectral wavelength coverage of the main light source selected with a spectral wavelength coverage of the CIE standard illuminant to be simulated;

a color temperature adjustment control channel formed by an LED as a light source of a color temperature adjustment control channel and a filter according to a color temperature simulation range and a color temperature adjustment direction of the CIE standard illuminant to be simulated;

a chromaticity measuring device configured to simulate a chromaticity coordinate of the CIE standard illuminant to be simulated;

a microcomputer controller configured to adjust a brightness of the main light source control channel, the wavelength complementary control channel, the color temperature adjustment control channel to make a mixed chromaticity coordinate reach a chromaticity coordinate of the CIE standard illuminant to be simulated according to chromaticity coordinates.

In an improvement solution, the system further includes:

a main light source control channel formed by a high-CM LED as the main light source according to the color temperature adjustment direction within the color temperature range of the simulated CIE standard illuminant to be simulated and less than or equal to 1 kind of main light source control channel chromaticity coordinate rectifying filter containing color material above the main light source;

a wavelength complementary control channel formed by a corresponding number of LEDs with n kinds of wavelength; wherein LEDs with n kinds of wavelength for supplementing the spectral wavelength coverage of the CIE standard illuminant to be simulated are selected to serve as a wavelength complementary control channel light source by comparing a spectral wavelength coverage of the main light source with a spectral wavelength coverage of the CIE standard illuminant to be simulated; a number of LED of each wavelength within LEDs with n kinds of wavelength are determined according to a relative radiant emittance of a wavelength of the LEDs with n kinds of wavelength within the standard illuminant of the wavelength complementary control channel within the spectral wavelength coverage of the CIE standard illuminant to be simulated and a radiant emittance of a wavelength of LED of each wavelength within the LEDs with n kinds of wavelength;

a color temperature adjustment control channel formed by an LED as a light source of the color temperature adjustment control channel and a filter according to the color temperature simulation range and color temperature adjustment direction of the CIE standard illuminant;

a chromaticity measuring device configured to simulate a chromaticity coordinate of the CIE standard illuminant to be simulated;

a microcomputer controller configured to adjust a brightness of the main light source control channel, the wavelength complementary control channel, the color temperature adjustment control channel to make a mixed chromaticity coordinate reach a chromaticity coordinate of the CIE standard illuminant to be simulated according to chromaticity coordinates.

In an improvement solution, the system further includes:

a tightly spaced group formed by the main light source control channel, the wavelength complementary control channel and the color temperature adjustment control channel according to a vertical distance between an anti-glare homogenize lens and the LED and a recommend ratio of an arrangement distance; wherein the tightly spaced group is replicated to achieve a required maximum illumination.

In an improvement solution, the system further includes:

a second main light source control channel for a color temperature of a key point.

In an improvement solution, the system further includes:

a behavior sensing sensor for detecting the occurrence of different events and transmitting the same to the microcomputer controller, wherein the microcomputer controller is further configured to form a closed-loop feedback system with the chromaticity measuring device, the microcomputer controller is further configured to receive the events transmitted by the behavior sensing sensor, and control an adjustment of color temperature and illuminance corresponding to the different events.

The method and illumination system for simulating a CIE standard illuminant with a multi-channel LED provided by the present invention, have the following beneficial effects:

1. In present invention, the LED control channels are reduced through group optimization, and a technology which is discarded by multi-channel LED such as a filter is used, a control of a light source substantially reducing number of control channels and enabling a multi-channel LED to simulate a standard illuminant is formed, such that a single chromaticity control rather than a chromaticity control which must be transformed by a spectral conversion is achieved. In the process of simulating CIE standard illuminant by multi-channel LED, a kind of low purity analysis technology can surpass or reach the performance of the light source which is achieved by the spectral colorimetric technology with higher analysis performance.

2. In the method, the correction adjustment and the closed-loop feedback control method is based on the chromaticity method instead of the spectral chromaticity method. Hence, the colorimetric instrument can be used in the feedback system when simulating the light source of the illuminant instead of the instrument adopting the spectroscopic technology such as the spectro colorimetric instrument or spectral radiance instrument, and the cost of the multi-channel illumination standard light source is greatly reduced. Basically, a spectral colorimetric sensor costs 15 times more than a non-spectral colorimetric sensor, that is, 15 times cost is lowered.

3. The technical indicators achieved by a low-grade process implemented by present invention exceed or reach that of a high-grade process.

4. The method provided by the invention realizes the reduction of the energy consumption, because LED needs the constant current circuit to supply power, and the series resistance or the constant current driving chip are required to realize the constant current, and the energy consumption cannot be converted from electricity to light. Too many control channels will have too many such losses. Since the present invention has fewer control channels, such that the energy consumption can be reduced.

5. Because the conventional LED simulation controls the corresponding overmuch channels by spectral function, the group control is impossible to perform. Any group will bring the possibility of disaccord with its principle. However, the method provided by the present invention only needs a few number of control channels to be controlled simultaneously by adopting pre-grouping optimization, and the reduction of channels by a large amount means further cost reduction. And its performance index is higher than that of the prior arts.

6. In the method provided by the present invention, the failure rate is low. Every time a control channel is added, the probability of failure will greatly increase, and the long-term stability is influenced. The failure rate is obviously reduced because the control channels are fewer in the present disclosure.

7. The method provided by the present invention overcomes the technical prejudice that the multi-channel LED simulation standard illuminant only relies on the infinite approximation of the spectral curve, and provides a new idea for those skilled in the art of multi-channel LED.
8. With the widespread use of an energy-saving product that is cheaper and more powerful than the traditional product price, the tolerance of related industry standards will be reduced, and the development of industries in the whole application of colorimetry will be promoted.
9. The present invention is beneficial to environmental protection. Mercury-containing fluorescent lamps can be phased out in related fields.

BRIEF DESCRIPTION OF THE DRAWINGS

FIG. 3 is a flow chart of a method for simulating a CIE standard illuminant by a multi-channel LED according to another embodiment of the present invention.

The steps illustrated in the flow diagram of the accompanying drawings may be performed in a computer system, such as a set of computer-executable instructions.

DETAILED DESCRIPTION OF THE EMBODIMENTS

Figure 1:
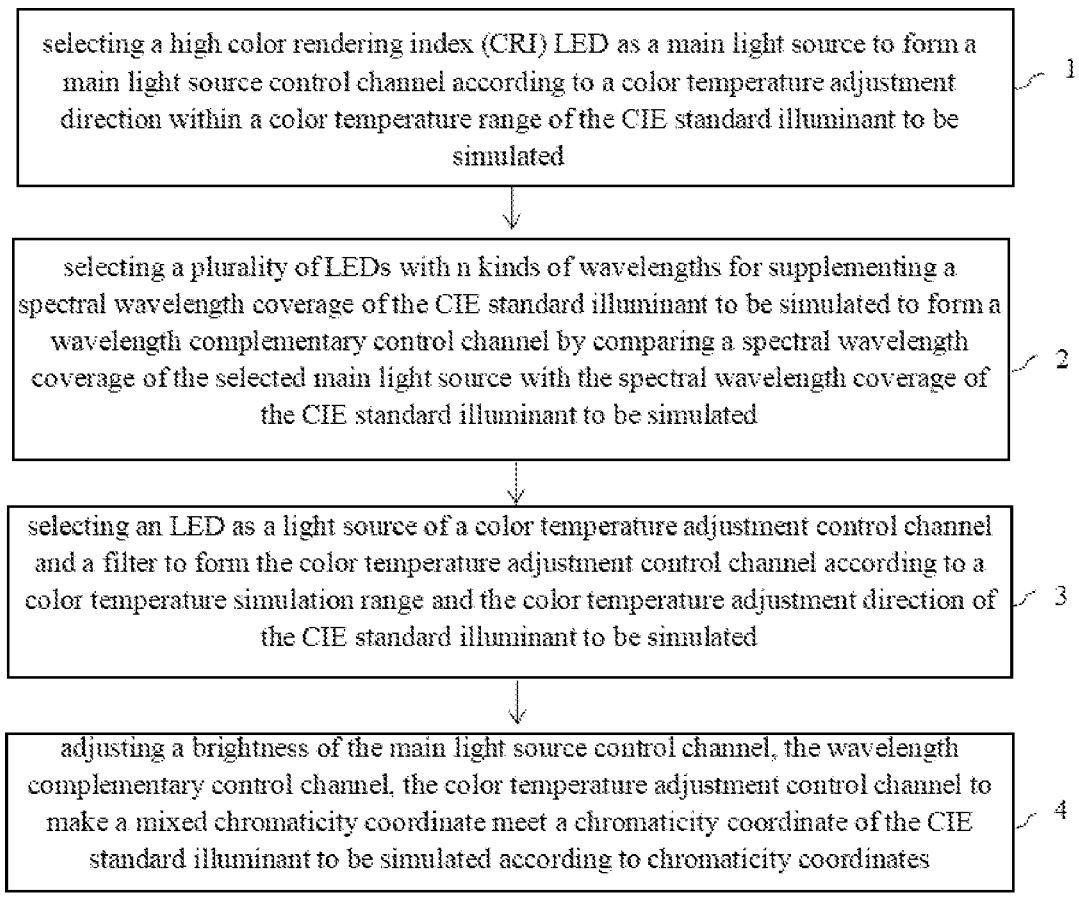
FIG. 1 is a flow chart of a method for simulating a CIE standard illuminant by a multi-channel LED in some embodiments of the present invention.

As shown in FIG. 1, some embodiments of the present invention provide a method for simulating a CIE standard illuminant by a multi-channel LED. The method includes:
(1) selecting a high-CRI LED as a main light source to form a main light source control channel according to a color temperature adjustment direction within a color temperature range of a CIE standard illuminant to be simulated;
(2) selecting LEDs with n kinds of wavelength for supplementing a spectral wavelength coverage of the CIE standard illuminant to be simulated to form a wavelength complementary control channel by comparing a spectral wavelength coverage of the main light source selected with a spectral wavelength coverage of the CIE standard illuminant to be simulated, wherein n≥1;
(3) selecting an LED as a light source of a color temperature adjustment control channel and a filter to form the color temperature adjustment control channel according to a color temperature simulation range and a color temperature adjustment direction of the CIE standard illuminant to be simulated;
(4) adjusting a brightness of the main light source control channel, the wavelength complementary control channel, the color temperature adjustment control channel to make a mixed chromaticity coordinate meet a chromaticity coordinate of the CIE standard illuminant to be simulated according to chromaticity coordinates.

In the method for simulating a CIE standard illuminant with multi-channel LED provided by the present invention, a multi-channel LED dimming is controlled by a chromaticity measuring device instead of a spectrum collecting device, when the chromaticity coordinate meets the standard, the color rendering index, color temperature and metamerism index are all meet the standard at the same time. In addition, the present invention provides the formation of preset color temperature change locus by the filter method of the LED multi-channel light mixing, and solves the problem of the influence of the LED lens yellowing on the light source. The multi-channel LED based on the method can also be applied to other illumination fields that do not need ultraviolet energy after equivalent displacement.

Figure 2:
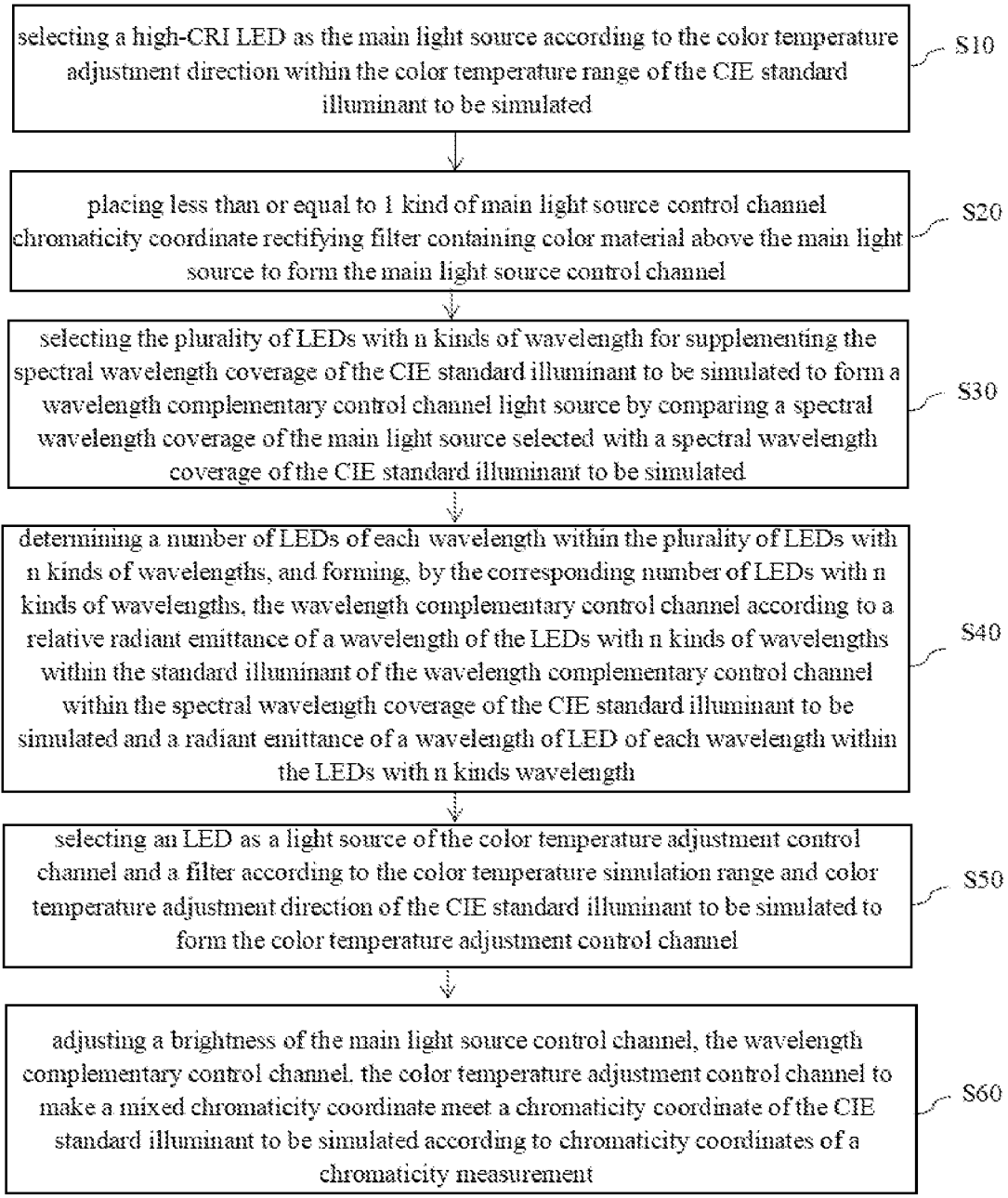
FIG. 2 is a flow chart of a method for simulating a CIE standard illuminant by a multi-channel LED according to another embodiment of the present invention.

As shown in FIG. 2, other embodiments of the present invention provide a method for simulating a CIE standard illuminant with a multi-channel LED. In the method, three preset channel LED are adjusted based on the chromaticity coordinates to realize a CIE standard illuminant light source with multi-color temperature and multi-brightness adjustment on demand, and the method includes the follow steps:

S10: selecting a high-CRI LED as the main light source according to the color temperature adjustment direction within the color temperature range of the simulated CIE standard to be simulated.

The CIE standard illuminant to be simulated is a standard illuminant D with color temperature adjustment coverage ranging from 5000K to 10000K, and the illumination environment shall meet the requirements of ISO3664 and ISO3668. According to D50 stipulated by ISO3664, a high-CRI LED close to 5000K is selected, and the average value of the color rendering index R1-14 of the high-CRI LED is greater than 90. In order to improve that performance, in this embodiment, the high-CRI LED whose average color rendering index R1-14 is greater than 95 is selected as the main light source of the main light source control channel. It can also be achieved by adjusting the color rendering index of the common white LED by a common white LED with an rgb color mixing to form a high-CRI LED. In short, the purpose is to form a channel with a color rendering index greater than 90%.

S20: placing less than or equal to 1 kind of main light source control channel chromaticity coordinate rectifying filter containing color material above the main light source to form the main light source control channel.

High display mean that that chromaticity coordinate reference of the LED is the cross point of the black body locus and the isotherm, and the chromaticity coordinate of the D light source relative to the daylight curve is located in the green direction of the cross point. In that present application, the main light source is provide with a rectifying filter. If that chromaticity coordinate of the control channel of the selected main light source does not deviate too much from the desire standard light source, the rectifying filter is not needed;

The chromaticity coordinate reference of the high-CM LED close to 5000K is the cross point of the blackbody locus and the isotherm. The chromaticity coordinate of the D light source relative to the daylight curve is located in the green direction of the cross point. In order to improve the simulation performance, the main light source is equipped with a rectifying filter. When the chromaticity coordinates of the selected main light source control channel do not deviate too much from the standard light source to be simulated, this rectifying filter is not required.

S30, selecting LEDs with n kinds of wavelength for supplementing the spectral wavelength coverage of the CIE standard illuminant to be simulated to form a wavelength complementary control channel light source by comparing a spectral wavelength coverage of the main light source selected with a spectral wavelength coverage of the CIE standard illuminant to be simulated.

In some preferred embodiments, by comparing the LED spectral wavelength coverage of the main light source with the spectral wavelength coverage of the standard illuminant D to be simulated, it is found that the main light source has no corresponding energy in the 380 nm-420 nm range. Therefore, 380-420 nm is selected as the supplement, and since no wavelength coverage can reach 380-420 nm, the wavelength coverage is divided into 380 nm, 400 nm and 420 nm to supplement respectively. That is, LEDs of three emission wavelengths are selected as the light source of the wavelength complementary control channel. It should be noted that if the LED of 420 nm wavelength is placed in the main light source control channel, the equivalent displacement may produce a light source which can be controlled separately by the ultraviolet part of the energy, and this light source is suitable for some light source environments which prohibit ultraviolet energy or individually adjustable ultraviolet energy, such as the observation environment of art works.

S40, determining a number of LED of each wavelength within LEDs with n kinds of wavelength, and a corresponding number of LEDs with n kinds of wavelength are used to form the wavelength complementary control channel according to a relative radiant emittance of a wavelength of the LEDs with n kinds of wavelength within the standard illuminant of the wavelength complementary control channel within the spectral wavelength coverage of the CIE standard illuminant to be simulated and a radiant emittance of a wavelength of LED of each wavelength within the LEDs with n kinds wavelength.

Wherein the number of LEDs of each wavelength required for such a supplement can be calculated by mapping the radiance of each individual LED of the LEDs with n kinds wavelength to the spectral radiance curve of the standard illuminant D50. All of these LEDs constitute a wavelength complementary control channel.

S50: selecting an LED as a light source of the color temperature adjustment control channel and a filter according to the color temperature simulation range and color temperature adjustment direction of the CIE standard illuminant to be simulated to form the color temperature adjustment control channel.

Wherein, the light emitted by the wavelength complementary control channel and the light of the color temperature adjustment control channel form two locus lines. The wavelength complementary control channel forms an adjustment locus line which is located on the CIE chromaticity diagram and tends to be vertical. The color temperature adjustment control channel forms an adjustment locus line close to the color temperature variation curve.

In the chromaticity diagram of CIE1976, the chromaticity coordinates of two color temperatures in the standard illuminant to be simulated are connected into a line by the color mixing principle. In the extend line near the color temperature rising direction of the connecting line, there will be a wavelength value cross point cross point formed with the outermost periphery of the chromaticity diagram, and the wavelength represented by the cross point is the wavelength of the color temperature adjustment control channel light source, namely 480 nm. The wavelength may be formed by a 450 nm LED and a transparent body of a mixed color material, which may be pigments, dyes, phosphors, quantum dots or the like that can absorb part of the spectrum and emit light of the wavelength, the mixed color material is preferably phosphors. Because the phosphor can not only absorb a part of the spectrum, but also be excited to emit light after absorption, and it has more energy-saving effect than pigments and dyes. Mixed pigment may be solidified or formed transparent object which may wrap or lock pigment, such as a transparent epoxy resin, silicone resin, glass, ceramic, etc. In the present invention, the transparent two-component epoxy resin and the fluorescent pow are mixed, and the mix ratio is preferably 19:1. In the present invention, since epoxy resin absorbs part of the spectrum, accurate ratio correction is performed according to the accuracy of plus or minus 1% of the ratio after the mixing ratio is determined, and fluorescent powder of other nm wavelength can be added. The purpose is to construct a chromaticity coordinate trace line within the color temperature adjustment range by using LED and phosphor, and to supplement the energy of other nm wavelengths in the adjustment process.

S60: adjusting a brightness of the main light source control channel, the wavelength complementary control channel, the color temperature adjustment control channel to make a mixed chromaticity coordinate meet a chromaticity coordinate of the CIE standard illuminant to be simulated according to chromaticity coordinates of a chromaticity measurement.

In that method, the chromaticity coordinate of a standard illuminant light source to be simulated is measured according to the chromaticity coordinate. The LEDs in the three control channels are lightened on the basis of the main light source control channel of the colorimetric measurement or analysis is used to measure chromaticity coordinates. The multi-color temperature and multi-illumination simulation of the required illuminant is completed by adjusting coordinates approximation of the cross point of the color temperature adjustment control channel and wavelength complementary control channel on the CIE chromaticity diagram and the chromaticity coordinate of the standard illuminant to be simulated.

The performance of the standard illuminant simulated by the above method is shown in Table 1.

TABLE 1

Performance of simulated standard illuminant

| performance index | color temperature range | | | |
| --- | --- | --- | --- | --- |
| | T-T + 1000k | T-T + 1500k | T-T + 2500k | T-T + 5000k |
| color rendering index | >99 | >97 | >95 | >90 |
| chromaticity coordinate deviation | <0.001 | <0.001 | <0.001 | <0.001 |
| visible light metamerism index | <0.5 | <0.5 | <0.5 | <1 |
| ultraviolet light metamerism index | <1 | <1 | <1 | <1.5 |
| Color temperature deviation | <50k | <50k | <50k | <50k |

Where T represents the color temperature of the main light source.

As shown in FIG. 3, other embodiments of the present invention provide a method for simulating a CIE standard illuminant with a multi-channel LED. In the method, three preset channel LED are adjusted based on the chromaticity coordinates to realize a CIE standard illuminant light source with multi-color temperature and multi-brightness adjustment on demand, and the method includes the follow steps:

S1: selecting a high-CM LED as the main light source according to the color temperature adjustment direction within the color temperature range of the simulated CIE standard to be simulated;

S2: Less than or equal to 1 kind of main light source control channel color product coordinate correcting filter is placed above the main light source to form the main light source control channel;

S3: Comparing the LED spectral wavelength coverage of the main light source selected in step S1 with the spectral wavelength coverage of the required simulated CIE standard illuminant, Selecting n kinds of wavelength LEDs for supplementing the required simulated CIE standard illumination volume spectral wavelength coverage as the wavelength complementary control channel light source; selecting LEDs with n kinds of wavelength for supplementing the spectral wavelength coverage of the CIE standard illuminant to be simulated to form a wavelength complementary control channel light source by comparing a spectral wavelength coverage of the main light source selected in step S1 with a spectral wavelength coverage of the CIE standard illuminant to be simulated;

S4: determining a number of LED of each wavelength within LEDs with n kinds of wavelength, and a corresponding number of LEDs with n kinds of wavelength are used to form the wavelength complementary control channel according to a relative radiant emittance of a wavelength of the LEDs with n kinds of wavelength within the standard illuminant of the wavelength complementary control channel within the spectral wavelength coverage of the CIE standard illuminant to be simulated and a radiant emittance of a wavelength of LED of each wavelength within the LEDs with n kinds wavelength;

S5, selecting an LED as a light source of the color temperature adjustment control channel and a filter according to the color temperature simulation range and color temperature adjustment direction of the CIE standard illuminant to be simulated to form the color temperature adjustment control channel;

S6, arranging the main light source control channel, the wavelength complementary control channel and the color temperature adjustment control channel according to a vertical distance between an anti-glare homogenize lens and the LED and a recommend ratio of an arrangement distance to form a tightly spaced group, and replicating the group to achieve a required maximum illumination;

S7: adjusting a brightness of the main light source control channel, the wavelength complementary control channel, the color temperature adjustment control channel to make a mixed chromaticity coordinate meet a chromaticity coordinate of the CIE standard illuminant to be simulated according to chromaticity coordinates of a chromaticity measurement;

S8, adding a second main light source control channel for a color temperature of a key point;

S9: forming a closed-loop feedback system by a microcomputer processor and a the chromaticity measurement.

Since the LED is a point light source, it will produce dazzling when used directly. The present invention uses an anti-glare homogenizing lens to avoid dazzling and make the homogenization effect better. In order to further improve the simulation performance, a second main light source channel can be added at the correspond color temperature, and the second main light source channel, a wavelength complementary control channel and a color temperature adjustment control channel are used to form a new local three-channel and integral four-channel. The color temperature is extended to a light source A, that is, the color temperature range is adjustable within 2700K-10000K, then, a 2700 k high-CRI LED may be added as the second main light source control channel, and the local three-channel and integral four-channel control may be formed by cooperating with the wavelength complementary control channel and the color temperature adjustment control channel. The chromaticity coordinates deviations are calibrated by forming a closed-loop feedback system to ensure a long-term use.

Figure 4:
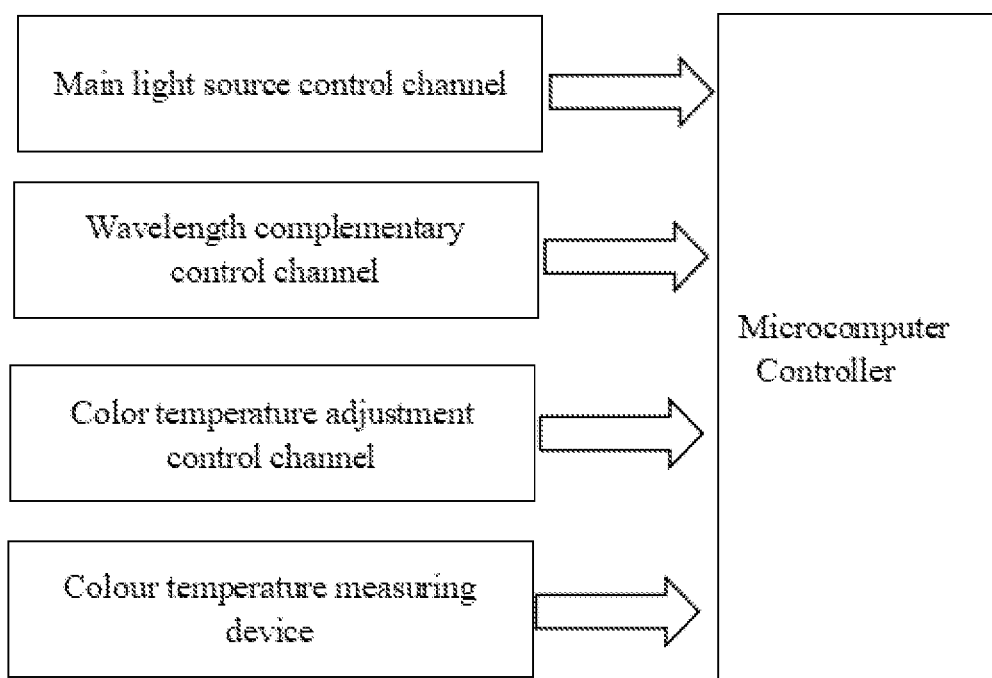
FIG. 4 is a structural block diagram of a multi-channel LED illumination system simulating a CIE standard illuminant in other embodiments of the present invention.

As shown in FIG. 4, in some preferred embodiments, the present invention provides an illumination system for simulating a CIE standard illuminant with a multi-channel LED, the illumination system including:

a main light source control channel using a high-CRI LED as a main light source, wherein the high-CRI LED is selected according to a color temperature adjustment direction within a color temperature range of a CIE standard illuminant to be simulated;

a wavelength complementary control channel formed by LEDs with n kinds of wavelength for supplementing a spectral wavelength coverage of the CIE standard illuminant to be simulated by comparing a spectral wavelength coverage of the main light source selected with a spectral wavelength coverage of the CIE standard illuminant to be simulated;

a color temperature adjustment control channel formed by an LED as a light source of a color temperature adjustment control channel and a filter according to a color temperature simulation range and a color temperature adjustment direction of the CIE standard illuminant to be simulated;

a chromaticity measuring device configured to simulate a chromaticity coordinate of the CIE standard illuminant to be simulated;

a microcomputer controller configured to adjust a brightness of the main light source control channel, the wavelength complementary control channel, the color temperature adjustment control channel to make a mixed chromaticity coordinate reach a chromaticity coordinate of the CIE standard illuminant to be simulated according to chromaticity coordinates.

The chromaticity measuring device is used to periodically collect the chromaticity coordinates of the CIE standard illuminant to be simulated and transmit them to the microcomputer controller, and the microcomputer controller makes a program response to the feedback information received from the chromaticity measuring device. In that use process, for example, the current illumination chromaticity coordinate can be periodically collected by a chromaticity sensor and transmit to a microcomputer controller, and the microcomputer controller judges that the current illumination; if it is qualified, the current illumination will be continued, if not, the main light source control channel, the wavelength complementary control channel and the color temperature adjustment control channel are adjusted to make them qualified.

In some preferred embodiments, the present invention provides an illumination system for simulating a CIE standard illuminant with a multi-channel LED. The illumination system is a CIE standard illuminant light source illumination system which realizes multi-color temperature and multi-illuminance adjustment as needed based on chromaticity coordinate adjustment of preset LED of three channels or more, the illumination system including:

a main light source control channel formed by a high-CM LED as the main light source according to the color temperature adjustment direction within the color temperature range of the simulated CIE standard illuminant to be simulated and less than or equal to 1 kind of main light source control channel chromaticity coordinate rectifying filter containing color material above the main light source;

a wavelength complementary control channel formed by a corresponding number of LEDs with n kinds of wavelength; wherein LEDs with n kinds of wavelength for supplementing the spectral wavelength coverage of the CIE standard illuminant to be simulated are selected to serve as a wavelength complementary control channel light source by comparing a spectral wavelength coverage of the main light source with a spectral wavelength coverage of the CIE standard illuminant to be simulated; a number of LED of each wavelength within LEDs with n kinds of wavelength are determined according to a relative radiant emittance of a wavelength of the LEDs with n kinds of wavelength within the standard illuminant of the wavelength complementary control channel within the spectral wavelength coverage of the CIE standard illuminant to be simulated and a radiant emittance of a wavelength of LED of each wavelength within the LEDs with n kinds of wavelength;

a color temperature adjustment control channel formed by an LED as a light source of the color temperature adjustment control channel and a filter according to the color temperature simulation range and color temperature adjustment direction of the CIE standard illuminant;

a chromaticity measuring device configured to simulate a chromaticity coordinate of the CIE standard illuminant to be simulated;

a microcomputer controller configured to adjust a brightness of the main light source control channel, the wavelength complementary control channel, the color temperature adjustment control channel to make a mixed chromaticity coordinate reach a chromaticity coordinate of the CIE standard illuminant to be simulated according to chromaticity coordinates. The illumination system for simulating a CIE standard illuminant with a multi-channel LED provided by the present invention can simulate the CIE standard illuminant with high performance.

Figure 5:
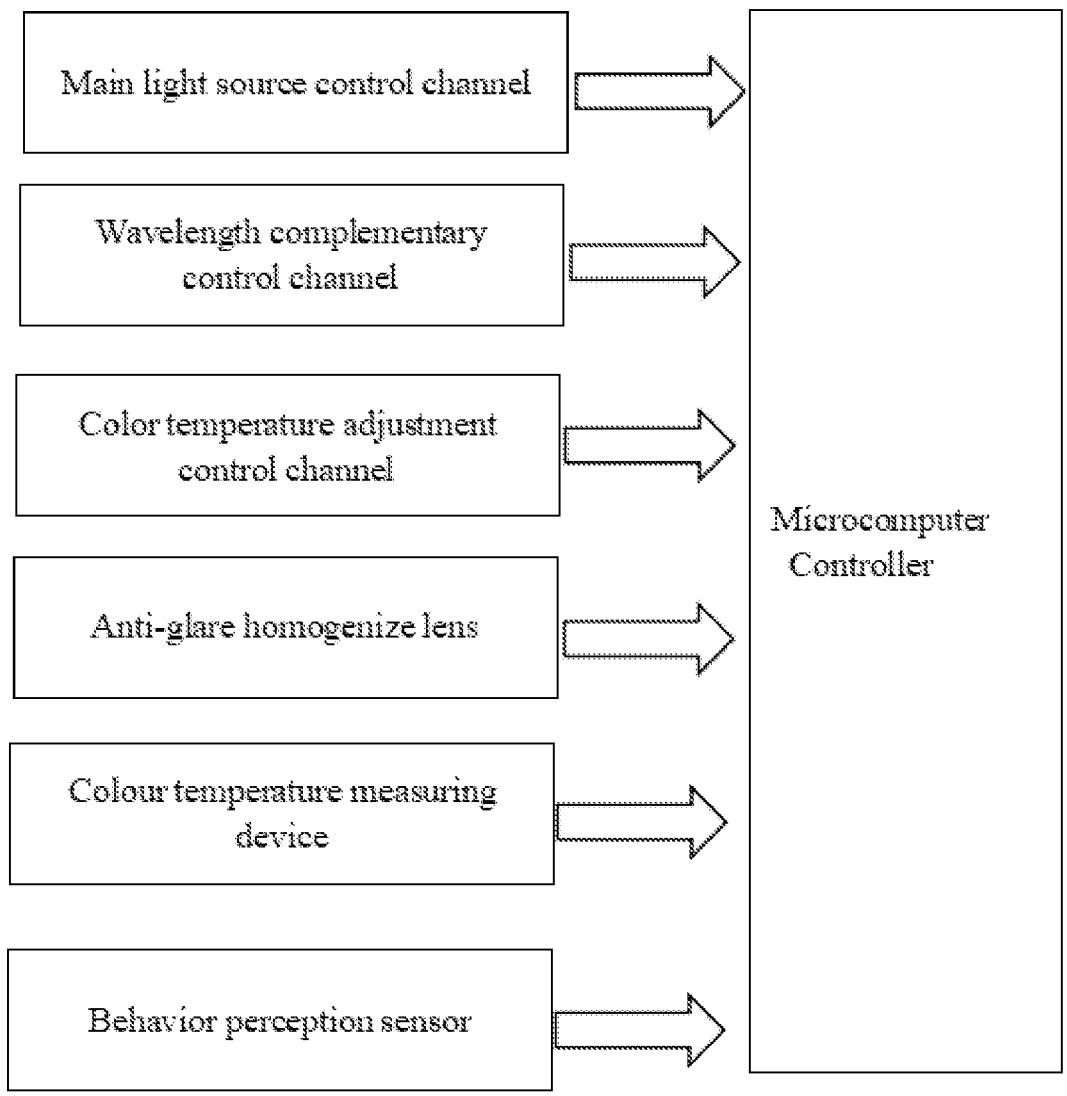
FIG. 5 is a structural block diagram of a multi-channel LED illumination system simulating a CIE standard illuminant according to other embodiments of the present invention.

As shown in FIG. 5, In some preferred embodiments, the present invention provides an illumination system for simulating a CIE standard illuminant with a multi-channel LED. The illumination system is a CIE standard illuminant light source illumination system which realizes multi-color temperature and multi-illuminance adjustment as needed based on chromaticity coordinate adjustment of preset LED of three channels or more, the illumination system including:

a main light source control channel formed by a high-CM LED as the main light source according to the color temperature adjustment direction within the color temperature range of the simulated CIE standard illuminant to be simulated and less than or equal to 1 kind of main light source control channel chromaticity coordinate rectifying filter containing color material above the main light source;

a wavelength complementary control channel formed by a corresponding number of LEDs with n kinds of wavelength; wherein LEDs with n kinds of wavelength for supplementing the spectral wavelength coverage of the CIE standard illuminant to be simulated are selected to serve as a wavelength complementary control channel light source by comparing a spectral wavelength coverage of the main light source with a spectral wavelength coverage of the CIE standard illuminant to be simulated; a number of LED of each wavelength within LEDs with n kinds of wavelength are determined according to a relative radiant emittance of a wavelength of the LEDs with n kinds of wavelength within the standard illuminant of the wavelength complementary control channel within the spectral wavelength coverage of the CIE standard illuminant to be simulated and a radiant emittance of a wavelength of LED of each wavelength within the LEDs with n kinds of wavelength;

a color temperature adjustment control channel formed by an LED as a light source of the color temperature adjustment control channel and a filter according to the color temperature simulation range and color temperature adjustment direction of the CIE standard illuminant;

a tightly spaced group formed by the main light source control channel, the wavelength complementary control channel and the color temperature adjustment control channel according to a vertical distance between an anti-glare homogenize lens and the LED and a recommend ratio of an arrangement distance; wherein the tightly spaced group is replicated to achieve a required maximum illumination;

a chromaticity measuring device configured to simulate a chromaticity coordinate of the CIE standard illuminant to be simulated;

a microcomputer controller configured to adjust a brightness of the main light source control channel, the wavelength complementary control channel, the color temperature adjustment control channel to make a mixed chromaticity coordinate reach a chromaticity coordinate of the CIE standard illuminant to be simulated according to chromaticity coordinates;

a second main light source control channel for a color temperature of a key point;

a behavior sensing sensor for detecting the occurrence of different events and transmitting the same to the microcomputer controller.

Wherein, the behavior sensing sensor is used to judge what kind of illumination, such as color temperature, brightness and illumination time is required by the user's behavior, and transmit the same to the microcomputer controller which performs control. When a user places the observed object in an area where the behavior sensing sensor can be responded, the behavior sensing sensor receives the behavior action and transmits the behavior action to the microcomputer controller. A microcomputer controller controls the three channels so that the illumination reaches a setting of a given action.

The illumination system for simulating a CIE standard illuminant with a multi-channel LED provided by the present invention can simulate the CIE standard illuminant with high performance.

What is claimed is:

1. A method for simulating an international commission on illumination (CIE) standard illuminant with a multi-channel light emitting diode (LED), comprising:

selecting a high color rendering index (CRI) LED as a main light source to form a main light source control channel according to a color temperature adjustment direction within a color temperature range of the CIE standard illuminant to be simulated; a display index of the main light source control channel is greater than 90%;

selecting a plurality of LEDs with n kinds of wavelengths for supplementing a spectral wavelength coverage of the CIE standard illuminant to be simulated to form a wavelength complementary control channel by comparing a spectral wavelength coverage of the selected main light source with the spectral wavelength coverage of the CIE standard illuminant to be simulated; wherein the n≥1; the wavelength of each of the plurality of LEDs with n kinds of wavelengths is 380-420 nm; wherein a number of LEDs of each wavelength within the plurality of LEDs with n kinds of wavelengths is determined according to a relative radiant emittance of wavelength of the plurality of LEDs with n kinds of wavelengths within the standard illuminant of the wavelength complementary control channel within the spectral wavelength coverage of the CIE standard illuminant to be simulated and a radiant emittance of wavelength of LED of each wavelength within the plurality of LEDs with n kinds wavelength; the wavelength complementary control channel is formed by corresponding number of LEDs with n kinds of wavelengths;

selecting an LED as a light source of a color temperature adjustment control channel and a filter to form the color temperature adjustment control channel according to a color temperature simulation range and the color temperature adjustment direction of the CIE standard illuminant to be simulated; wavelength of the color temperature adjustment control channel light source is formed by the LED and a transparent body of a mixed pigment; a material of the mixed pigment comprises pigments, dyes, phosphors, quantum dots, which absorbs part of the spectrum and emits light of the wavelength, or can be cured or formed into a transparent object covering and sandwiching the pigment;

arranging the main light source control channel, the wavelength complementary control channel and the color temperature adjustment control channel according to vertical distances between an anti-glare homogenize lens and the high color rendering index LED, the plurality of LEDs with n kinds of wavelength and the LED and a ratio of the vertical distances to form a tightly spaced group, and replicating the group to achieve a required maximum illumination;

adjusting a brightness of the main light source control channel, the wavelength complementary control channel, the color temperature adjustment control channel to make a mixed chromaticity coordinate meet a chromaticity coordinate of the CIE standard illuminant to be simulated according to chromaticity coordinates of a chromaticity measurement.

2. The method for simulating a CIE standard illuminant with a multi-channel LED of claim 1, further comprising:

placing less than or equal to 1 kind of main light source control channel chromaticity, coordinate rectifying filter containing color material above the main light source to form the main light source control channel; a display index of the main light source control channel is greater than 90%;

selecting the plurality of LEDs with n kinds of wavelength for supplementing the spectral wavelength coverage of the CIE standard illuminant to be simulated to form a wavelength complementary control channel light source by comparing a spectral wavelength coverage of the main light source selected with a spectral wavelength coverage of the CIE standard illuminant to be simulated.

3. The method for simulating a CIE standard illuminant with a multi-channel LED of claim 1, further comprising adding a second main light source control channel.

4. The method for simulating a CIE standard illuminant with a multi-channel LED of claim 3, further comprising: forming a closed-loop feedback system by a microcomputer processor and a chromaticity measurement.

5. An illumination system for simulating a CIE standard illuminant with a multi-channel LED, comprising:

a main light source control channel using a high-CRI LED as a main light source; wherein the high-CRI LED is selected according to a color temperature adjustment direction within a color temperature range of a CIE standard illuminant to be simulated;

a display index of the main light source control channel is greater than 90%;

a wavelength complementary control channel formed by a plurality of LEDs with n kinds of wavelength for supplementing a spectral wavelength coverage of the CIE standard illuminant to be simulated by comparing a spectral wavelength coverage of the main light source selected with a spectral wavelength coverage of the CIE standard illuminant to be simulated; the wavelength of each of the plurality of LEDs with n kinds of wavelengths is 380-420 nm; wherein a number of LEDs of each wavelength within the plurality of LEDs with n kinds of wavelengths is determined according to a relative radiant emittance of wavelength of the plurality of LEDs with n kinds of wavelengths within the standard illuminant of the wavelength complementary control channel within the spectral wavelength coverage of the CIE standard illuminant to be simulated and a radiant emittance of wavelength of LED of each wavelength within the plurality of LEDs with n kinds wavelength;

a color temperature adjustment control channel formed by an LED as a light source of a color temperature adjustment control channel and a filter according to a color temperature simulation range and a color temperature adjustment direction of the CIE standard illuminant to be simulated; wavelength of the color temperature adjustment control channel light source is formed by the LED and a transparent body of a mixed pigment; a material of the mixed pigment comprises pigments, dyes, phosphors, quantum dots, which absorbs part of the spectrum and emits light of the wavelength, or can be cured or formed into a transparent object covering and sandwiching the pigment;

a chromaticity measuring device configured to simulate a chromaticity coordinate of the CIE standard illuminant to be simulated;

an anti-glare homogenize lens configured to achieve a required maximum illumination by arranging the main light source control channel, the wavelength complementary control channel and the color temperature adjustment control channel according to vertical distances between the anti-glare homogenize lens and the high-CRI LED, the plurality of LEDs with n kinds of wavelength and the LED and a ratio of the vertical distances to form a tightly spaced group, and replicating the group;

a microcomputer controller configured to adjust a brightness of the main light source control channel, the wavelength complementary control channel, the color temperature adjustment control channel to make a mixed chromaticity coordinate reach a chromaticity coordinate of the CIE standard illuminant to be simulated according to chromaticity coordinates.

6. The illumination system for simulating a CIE standard illuminant with a multi-channel LED of claim 5, wherein the main light source control channel is further formed by the high-CRI LED as the main light source according to the color temperature adjustment direction within the color temperature range of the simulated CIE standard illuminant to be simulated and less than or equal to one kind of main light source control channel chromaticity coordinate rectifying filter containing color material above the main light source; a display index of the main light source control channel is greater than 90%;

the wavelength complementary control channel is further formed by a corresponding number of the plurality of LEDs with n kinds of wavelengths; wherein the LEDs with n kinds of wavelength for supplementing the spectral wavelength coverage of the CIE standard illuminant to be simulated are selected to serve as a wavelength complementary control channel light source by comparing a spectral wavelength coverage of the main light source with a spectral wavelength coverage of the CIE standard illuminant to be simulated.

7. The illumination system for simulating a CIE standard illuminant with a multi-channel LED of claim 5, further comprising:

a second main light source control channel.

8. The illumination system for simulating a CIE standard illuminant with a multi-channel LED of claim 5, further comprising:

a behavior sensing sensor configured to receive user's behavior action and judge user requirement regarding color temperature, brightness and illumination time, and then transmit the user requirement to the microcomputer controller, wherein the microcomputer controller is further configured to form a closed-loop feedback system with the chromaticity-measuring device, the microcomputer controller is further configured to control an adjustment of color temperature and illuminance corresponding to the user requirement.

* * * * *